US006960777B2

(12) United States Patent
Soar

(10) Patent No.: US 6,960,777 B2
(45) Date of Patent: Nov. 1, 2005

(54) IMAGE-FORMING DEVICE SENSING MECHANISM

(75) Inventor: Steven Soar, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 138 days.

(21) Appl. No.: 10/646,489

(22) Filed: Aug. 23, 2003

(65) Prior Publication Data

US 2005/0040348 A1 Feb. 24, 2005

(51) Int. Cl.7 .......................... G01N 21/86; G01V 8/00

(52) U.S. Cl. ........................... 250/559.11; 250/559.18; 356/445

(58) Field of Search ...................... 250/559.11–559.18, 250/559.39, 559.4, 559.44; 356/445–446; 347/16, 19, 101–107, 153, 155, 164, 191, 347/212, 215, 217, 222, 227, 230, 241, 251, 347/262, 264; 346/46–54, 111–133

(56) References Cited

U.S. PATENT DOCUMENTS

| | | | | |
|---|---|---|---|---|
| 4,019,819 A | | 4/1977 | Lodzinski | |
| 4,255,057 A | | 3/1981 | Williams | |
| 4,352,988 A | | 10/1982 | Ishida | |
| 4,540,887 A | * | 9/1985 | Minerd et al. | 250/559.4 |
| 4,723,072 A | | 2/1988 | Naruse | |
| 4,760,271 A | | 7/1988 | Brenholdt | |
| 4,931,657 A | * | 6/1990 | Houston et al. | 250/559.08 |
| 5,216,258 A | | 6/1993 | McConnell | |
| 5,573,236 A | | 11/1996 | Petocchi et al. | |
| 5,821,551 A | | 10/1998 | Roh | |
| 5,975,674 A | | 11/1999 | Beauchamp et al. | |
| 6,036,298 A | | 3/2000 | Walker | |
| 6,291,829 B1 | * | 9/2001 | Allen et al. | 250/559.07 |
| 6,322,192 B1 | | 11/2001 | Walker | |
| 6,325,505 B1 | | 12/2001 | Walker | |
| 6,352,332 B1 | | 3/2002 | Walker | |
| 6,386,669 B1 | | 5/2002 | Scofield et al. | |
| 6,497,179 B1 | * | 12/2002 | Allen et al. | 101/484 |
| 6,557,965 B2 | | 5/2003 | Walker et al. | |
| 6,561,643 B1 | | 5/2003 | Walker et al. | |
| 6,838,687 B2 | * | 1/2005 | Tullis et al. | 250/559.07 |

* cited by examiner

*Primary Examiner*—David Porta
*Assistant Examiner*—Patrick J. Lee

(57) ABSTRACT

A sensing mechanism for an image-forming device of one embodiment of the invention is disclosed that includes a first light source, a second light source, a detector, and a controller. The first light source is positioned incident to a first side of media, whereas the second light source is positioned incident to a second side of media opposite of the first side of the media. The detector is positioned incident to the second side of the media to detect first light transmitted through the media as output by the first light source, and to detect second light reflected off the media as output by the second light source. The controller is to detect at least one characteristic of the media based on a ratio of the first light to the second light.

35 Claims, 9 Drawing Sheets

IMAGE-FORMING DEVICE SENSING MECHANISM

BACKGROUND

Inkjet printers have become popular for printing on media, especially when precise printing of color images is needed. For instance, such printers have become popular for printing color image files generated using digital cameras, for printing color copies of business presentations, and so on. An inkjet printer is more generically an image-forming device that forms images onto media, such as paper.

To ensure that inkjet printing is performed optimally, the media type of the media that is being used may be specified to the inkjet printer. For example, plain paper, bond paper, transparency media, and photo paper are all different types of media. These different types of media have different properties that, among other things, affect how ink is absorbed or dried on the media.

Therefore, it can be useful to specify to the inkjet printer the type of media currently being used. This allows the inkjet printer to modify how it ejects ink onto the media, such as the speed at which it ejects ink onto the media, as well as the volume of ink it ejects onto the media, and other inkjet-printing variables. If the wrong type of media is specified, or if the printer is otherwise not aware of the type of media being used, print quality can suffer.

SUMMARY OF THE INVENTION

A sensing mechanism for an image-forming device of one embodiment of the invention includes a first light source, a second light source, a detector, and a controller. The first light source is positioned incident to a first side of media, whereas the second light source is positioned incident to a second side of media opposite of the first side of the media. The detector is positioned incident to the second side of the media to detect first light transmitted through the media as output by the first light source, and to detect second light reflected off the media as output by the second light source. The controller is to detect at least one characteristic of the media based on a ratio of the first light to the second light.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice these embodiments of the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Sensing Mechanism

Figure 1:
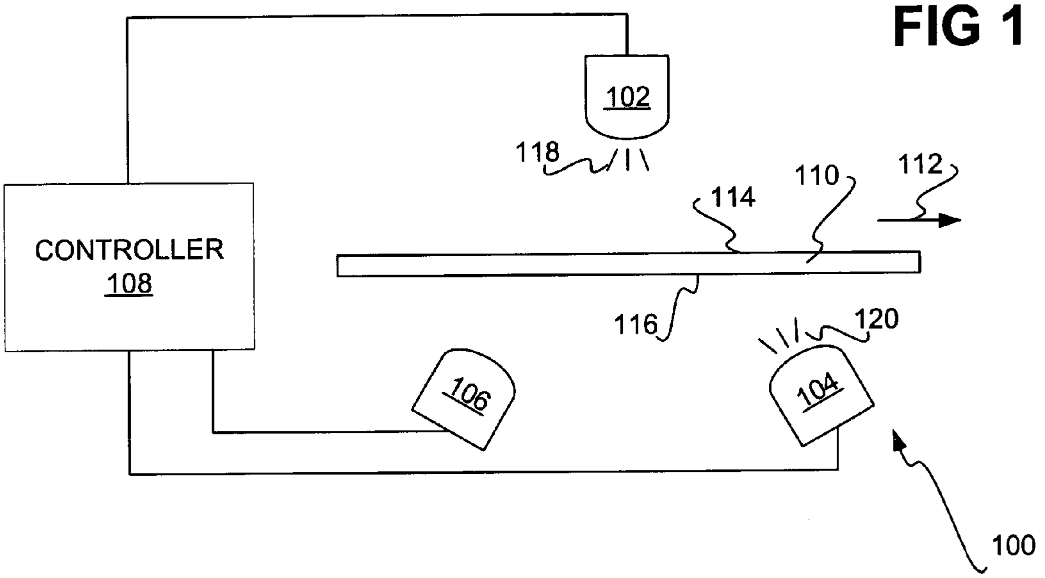
FIG. 1 is a diagram of a sensing mechanism for an image-forming device, according to an embodiment of the invention.

FIG. 1 shows a sensing mechanism 100 for an image-forming device, according to an embodiment of the invention. Media 110 moves through the sensing mechanism 100 from left to right, as indicated by the arrow 112. The media 110 may be plain paper media, bond paper media, transparency media, glossy media, photo media, or another type of media. The sensing mechanism 100 includes light sources 102 and 104, a detector 106, and a controller 108.

The light sources 102 and 104 may be light-emitting diodes (LED's), or other types of light sources. Each of the light sources 102 and 104 may actually be or include more than one individual light source. The light source 102 emits light 118, whereas the light source 104 emits light 120. The light source 102 is positioned incident to the side 114 of the media 110. The light source 102 may be positioned at a right angle to the side 114 of the media 110. The light source 104 is positioned to the side 116 of the media 110, which is opposite of the side 114 of the media 110. The light source 102 may be positioned at an oblique angle to the side 114 of the media 110.

The detector 106 may be a phototransistor, or another type of light detector or sensor. The detector 106 may actually be or include more than one individual such detector. The detector 106 is also positioned incident to the side 116 of the media 110. The light source 104 and the detector 106 may be positioned in relation to one another in accordance with Snell's Law, such that the angle of incidence is equal to the angle of reflection. The detector 106 detects the light 118 emitted by the light source 102 as transmitted through the media 110. The detector 106 also detects the light 120 emitted by the light source 104 as reflected off the media 110.

The controller 108 may include hardware, software, or a combination of hardware and software. The controller 108 controls the turning on and off the light sources 102 and 104, and receives values from the detector 106 corresponding to the light 118 and 120 detected by the detector 106. The controller may detect, or determines, one or more characteristics of the media 110 based on the ratio of the light 118 emitted through the media 110 as detected by the detector 106 to the light 120 reflected off the media 110 as detected by the detector 106.

Figure 2:
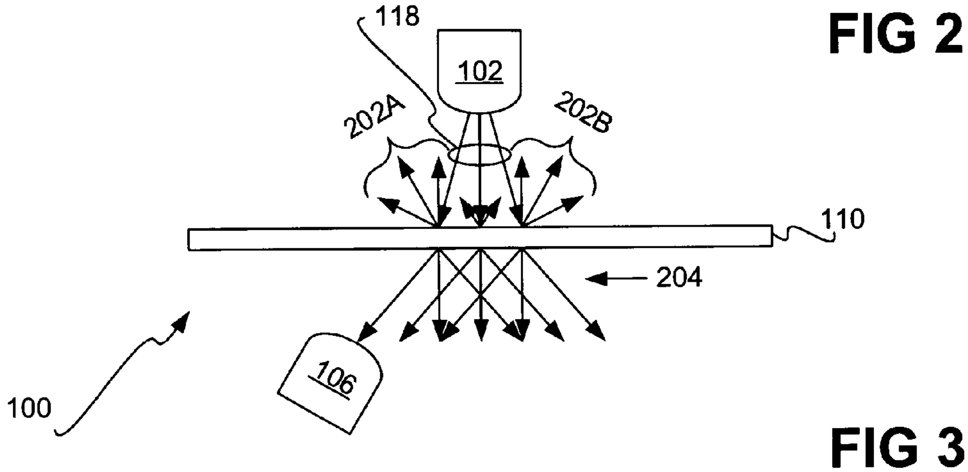
FIG. 2 is a diagram showing how light is transmitted through media and detected by a detector of a sensing mechanism, according to an embodiment of the invention.

FIG. 2 shows how the detector 106 specifically detects the light 118 emitted by the light source 102 as transmitted through the media 110, according to an embodiment of the invention. The controller 108 and the light source 104 of the sensing mechanism 100 are not depicted in FIG. 2 for illustrative clarity. The light source 102 emits the light 118. Depending on the type of the media 110, some of the light 118 is reflected off the media 110, which is the reflected light 202A and 202B, collectively referred to as the reflected light 202. Some of the light 118 is also transmitted through the media 110, which is the transmitted light 204.

The detector 106 thus detects the transmitted light 204, which is the part of the light 118 emitted by the light source 102 that is transmitted through the media 110. The intensity of the light sources 102 and 104 may be set so that the detector 106 provides mid-range signal responses with respect to plain paper media in detecting both the reflected light 202 and the transmitted light 204. This assures that an adequate range of signal responses is available to accommodate media having different transmission and reflection characteristics. However, it should be recognized that other intensity settings of light sources 102 and 104 may be used.

Figure 3:
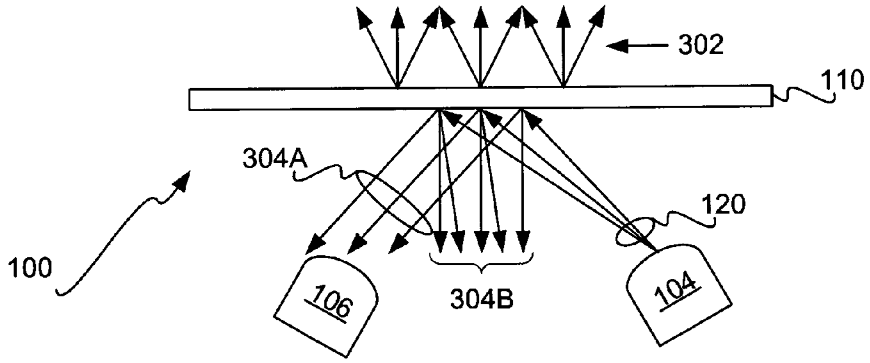
FIG. 3 is a diagram showing how light is reflected off media and detected by a detector of a sensing mechanism, according to an embodiment of the invention.

FIG. 3 shows how the detector 106 specifically detects the light 120 emitted by the light source 102 as reflected off the media 110, according to an embodiment of the invention. The controller 108 and the light source 102 of the sensing mechanism 100 are not depicted in FIG. 3 for illustrative clarity. The light source 104 emits the light 120. Depending on the type of the media 110, some of the light 120 is transmitted through the media, which is the transmitted light 302. Some of the light 120 is also reflected off the media 110, which is the reflected light 304A and 304B, collectively referred to as the reflected light 304.

So that the detector 106 is detecting at any given time just the transmitted light 204 of FIG. 2 or just the reflected light 304 of FIG. 3, the controller 108 of the sensing mechanism 100 of FIGS. 1, 2, and 3 can rapidly turn on and off the light sources 102 and 104 in succession, such that at any given time just one of the light sources 102 and 104 is on and emitting light. The light sources 102 and 104 are turned on and off in succession at a given frequency that has a corresponding period. The controller 108 can determine the ratio of the transmitted light 204 to the reflected light 304 after the occurrence of one or more such periods, or can wait for a longer length of time, such as a length of time equal to an order of ten or greater of this period.

Because different types of media have different reflectivities and transmistivities, the controller is able to determine the type of media based on the ratio of the transmitted light 204 to the reflected light 304, such that the sensing mechanism 100 of FIGS. 1, 2, and 3 can be considered as at least a media type-sensing mechanism. As can be appreciated by those of ordinary skill within the art, the choice of having the transmitted light 204 in the numerator and the reflected light 304 in the denominator in the ratio is an arbitrary one. Therefore, having the transmitted light 204 as the denominator and the reflected light 304 as the numerator is encompassed within the terminology of the ratio of the transmitted light 204 to the reflected light 304.

Furthermore, the ratio of the transmitted light 204 to the reflected light 304 can be employed to detect other characteristics of the media 110. For instance, where the media 110 is not present, the transmitted light 204 is at a maximum value, and the reflected light 304 is at a minimum value, because there is nothing between the light sources 102 and 104 to reflect light. In such instance, the ratio of the transmitted light 204 to the reflected light 304 can be used to determine whether an out-of-media, or no-media load situation has occurred. Similarly, the ratio can be used to detect the edge of the media 110, as the media 119 is entering the image-forming device or exiting the image-forming device, since the ratio abruptly changes once the media 110 passes between the light sources 102 and 104. In such instance, the sensing mechanism 100 of FIGS. 1, 2, and 3 can be considered as at least an edge-sensing mechanism.

In addition, where two or more sheets of the media 110 are traveling between the light sources 102 and 104 at the same time, instead of just one sheet of the media 110 as anticipated, the reflectivity and the transmistivity of the two or more sheets differ from that of a single sheet. Therefore, the ratio of the transmitted light 204 to the reflected light 304 can be used to detect that what is referred to as a multi-pick situation has occurred, such that the sensing mechanism 100 can be considered as a multi-pick sensing mechanism. Furthermore, codes, such as bar codes and other types of codes, that are imprinted on either the side 114 or the side 116 of the media affect light transmission and/or reflectivity, such that the ratio of the transmitted light 204 to the reflected light 304 can be used to detect and recognize such codes.

It is noted that by utilizing the ratio of the transmitted light 204 to the reflected light 304 to determine one or more characteristics of the media 110 traveling between the light sources 102 and 104, the controller 108 avoids having to make adjustments for the distance of the media 110 relative to each of the light sources 102 and 104. The transmitted light 204 and the reflected light 304 as detected by the detector 106 can vary depending on the distance of the media 110 to each of the light sources 102 and 104. However, using the ratio of the transmitted light 204 to the reflected light 304 compensates for these distances, such that determination of the characteristics of the media 110 is independent of them. That is, utilizing the ratio of the transmitted light 204 to the reflected light 304 renders determining or detecting the characteristics of the media 110 independent of the distances at which the transmitted light 204 and the reflected light 304 are detected by the detector 206.

Using the Ratio of Transmitted Light to Reflected Light

Figure 4A:
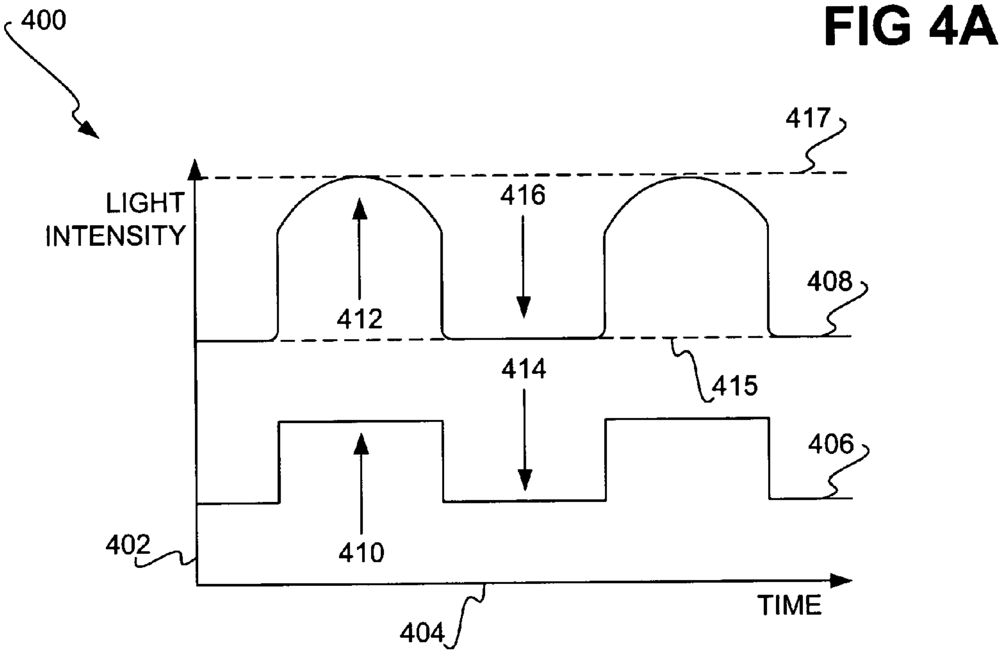
FIGS. 4A–4H are graphs showing how the ratio of the light transmitted through media to the light reflected off the media, as well as the light transmitted through the media and the light reflected off the media individually, can be used to determine characteristics of the media, according to varying embodiments of the invention.

FIGS. 4A–4H show different graphs that illustratively depict how the ratio of the transmitted light 204 as detected by the detector 206 to the reflected light 304 as detected by the detector 206 can be employed to determine characteristics of the media 110, according to varying embodiments of the invention. In FIG. 4A, the graph 400 specifically represents the situation where the media 110 is not currently traveling between the light sources 102 and 104. The graph 400 has a y-axis 402 that denotes light intensity and an x-axis 404 that denotes time.

The line 406 of the graph 400 of FIG. 4A indicates whether the transmissive light source 102 is on or whether the reflective light source 104 is on. High sections of the line 406, such as the section 410, correspond to the light source 102 transmitting light, whereas low sections of the line 406, such as the section 414, correspond to the light source 104 transmitting light. That is, over the section 410, the light source 102 is on and the light source 104 is off, whereas over the section 414, the light source 104 is on and the light source 102 is off.

The line 408 of the graph 400 of FIG. 4A indicates the light detected by the detector 106. Sections of the line 408 corresponding to high sections of the line 406, such as the section 412, correspond to the transmitted light 204 through the media 110 as detected by the detector 106. Sections of the line 408 corresponding to low sections of the line 406, such as the section 416, correspond to the reflected light 304 off the media 110 as detected by the detector 206. The line 408 can vary in value between the dotted line 415 and the dotted line 417, corresponding to minimum and maximum values of the light detected by the detector 106, respectively.

The section 412 of the graph 400 of FIG. 4A is at the maximum value, indicating that nearly all of the light 118 emitted by the light source 102 is detected as the light 204 by the detector 106, because there is no media 110 actually present to absorb any of the light 118. By comparison, the section 416 is at the minimum value, indicating that nearly none of the light 120 emitted by the light source 104 is detected as the light 304 by the detector 106, also because there is no media 110 present to reflect any of the light 120 back to the detector 106. The ratio of the light 204 to the light 304 may have a value approaching infinity.

Figure 4B:
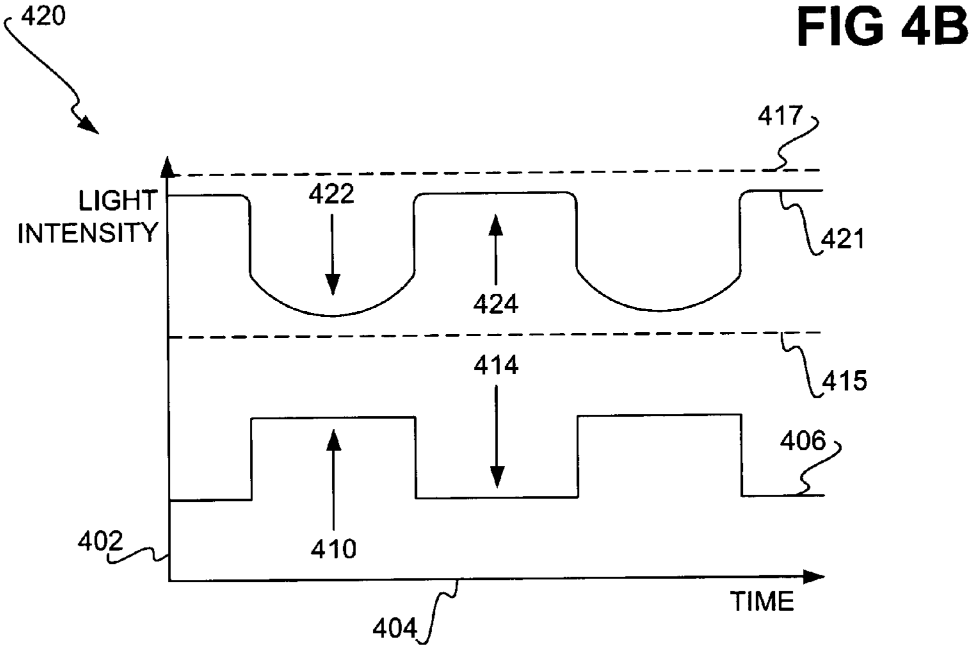

In FIG. 4B, the graph 420 represents the situation where the media 110 traveling between the light sources 102 and 104 is glossy media. The line 421 indicates the light detected by the detector 106. Sections of the line 421 corresponding to high sections of the line 406, such as the section 422, correspond to the transmitted light 204 detected by detector 106, and sections of the line 421 corresponding to low sections of the line 406, such as the section 424, correspond to the reflected light 304 detected by the detector 106. The line 421 can vary in value between the dotted lines 415 and 417.

The section 422 of the graph 420 of FIG. 4B is near the minimum value, indicating that nearly none of the light 118 emitted by the light source 102 is detected as the light 204 by the detector 106, because little of the light 118 transmits through the glossy media 110. By comparison, the section 424 is near the maximum value, indicating that most of the light 120 emitted by the light source 104 is detected as the light 304 by the detector 106, because most of the light 120 is reflected off the glossy media 110. The ratio of the transmitted light 204 to the reflected light 304 may have a value of about 0.5, where the reflected light 304 has a normalized value of at least 75%.

Figure 4C:
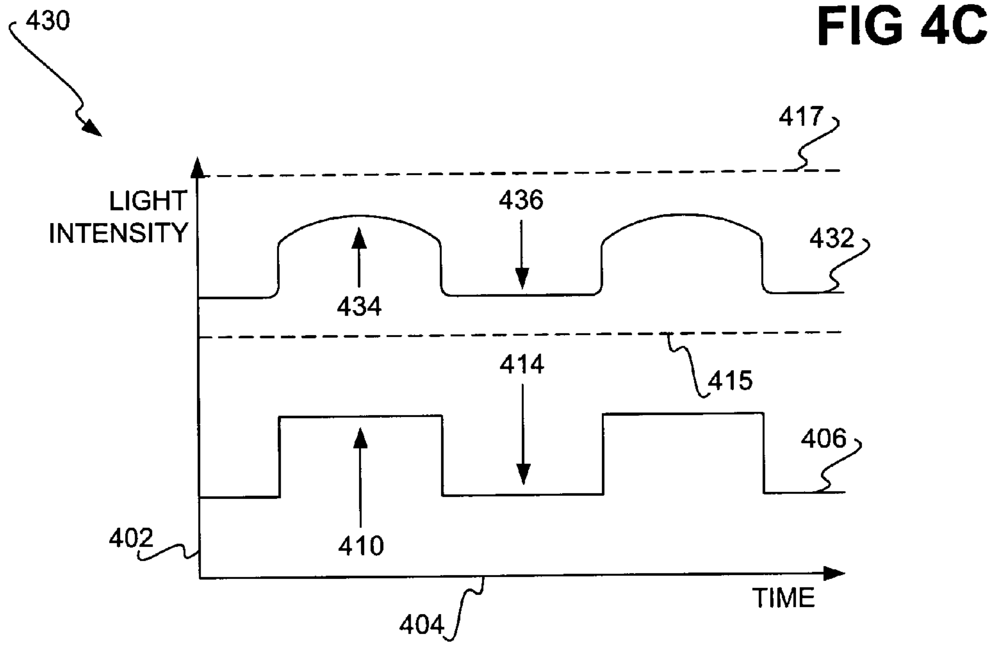

In FIG. 4C, the graph 430 represents the situation where the media 110 is transparency media. The line 432 indicates the light detected by the detector 106. Sections of the line 432 corresponding to high sections of the line 406, such as the section 434, correspond to the transmitted light 204 detected, and sections of the line 432 corresponding to low sections of the line 406, such as the section 436, correspond to the reflected light 304 detected. The measurement range of the system extends between the dotted lines 415 and 417. The section 434 is near the maximum value, because nearly all of the light 118 is transmitted through the transparency media 110. The section 436 has a moderate value between the maximum and minimum values, because a moderate amount of the light 120 is reflected by the transparency media 110. The ratio of the transmitted light 204 to the reflected light 304 may have a value of at least 1.5.

Figure 4D:
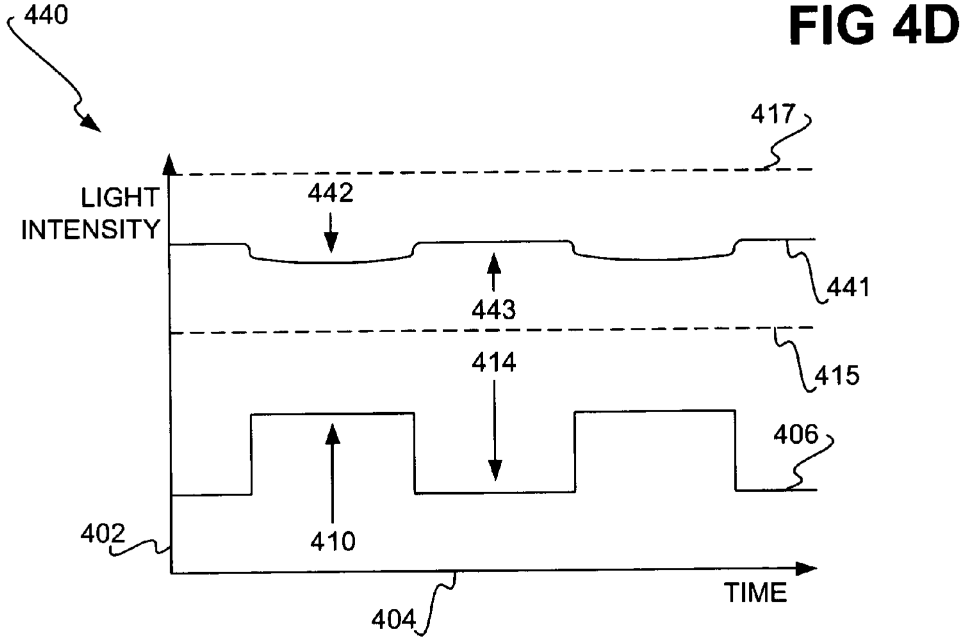

In FIG. 4D, the graph 440 represents the situation where the media 110 is plain paper media. The line 441 indicates the light detected by the detector 106. Sections of the line 441 corresponding to high sections of the line 406, such as the section 442, correspond to the transmitted light 204 detected, and sections of the line 441 corresponding to low sections of the line 406, such as the section 443, correspond to reflected light 304 detected. Both the sections 442 and 443 have a moderate value between the maximum and minimum values, because a moderate amount of the light 118 is transmitted through the plain paper media 110, and a moderate amount of the light 120 is reflected off the plain paper media 110. The ratio of the transmitted light 204 to the reflected light 304 may have a value of about 1.0.

Figure 4E:
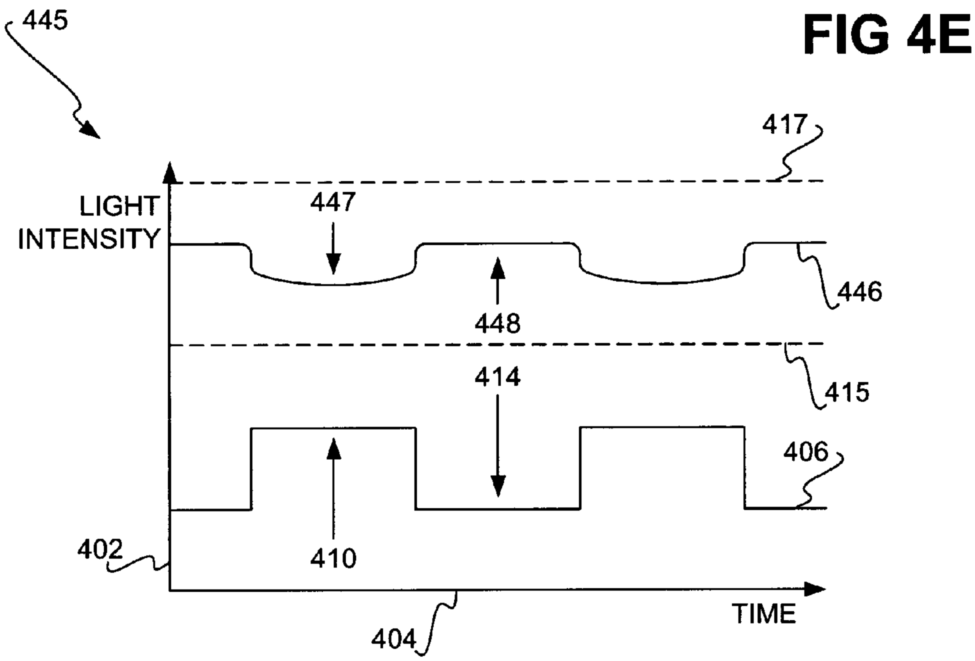

In FIG. 4E, the graph 445 represents the situation where the media 110 is bond paper media. The line 446 indicates the light detected by the detector 106. Sections of the line 446 corresponding to high sections of the line 406, such as the section 447, correspond to the transmitted light 204 detected, and sections of the line 446 corresponding to low sections of the line 406, such as the section 448, correspond to the reflected light 304 detected.

The section 447 of the graph 445 of FIG. 4E has a low value towards the minimum value, because less of the light 118 is transmitted through the bond paper media 110, as compared to the plain paper media 110 as depicted in FIG. 4D. The section 448 has a moderate value between the maximum and minimum values, because a moderate amount of the light 120 is reflected off the bond paper media 110, comparable to that reflected off the plain paper media 110 as depicted in FIG. 4D. The ratio of the transmitted light 204 to the reflected light 304 may have a value of about 0.5, where the reflected light 304 has a value of less than 75%.

Figure 4F:
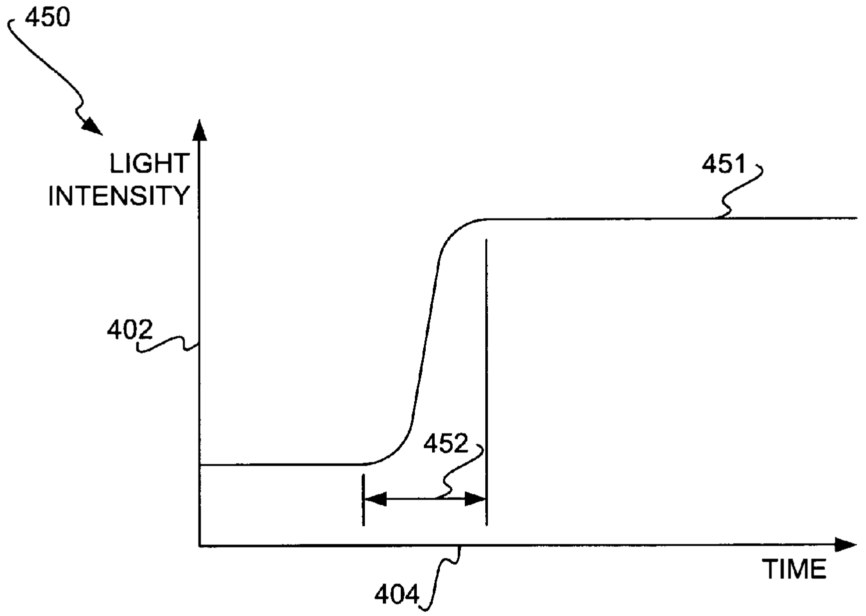

In FIG. 4F, the graph 450 represents the situation where the media 110 is being loaded between the light sources 102 and 104, such that the sensing mechanism 100 can be used as a media edge-sensing mechanism, or an out of media-sensing mechanism. The line 451 indicates the reflected light 304 detected by the detector 106, emitted as the light 120 by just the light source 104. That is, the line 451 does not denote any of the transmitted light 204 detected by the detector 106, as emitted as the light 118 by the light source 102.

Within the section 452 of the graph 450 of FIG. 4F, the value of the line 451 increases markedly. This corresponds to the edge of the media 110 beginning to travel between the light sources 102 and 104. Prior to the section 452, the value of the line 451 is minimal because little or none of the light 120 is reflected where the media 110 has yet to travel between the light sources 102 and 104. Subsequent to the section 452, the value of the line 451 has a greater value because the light 120 is reflected off the media 110 as the reflected light 304. It is noted that either the light source 102 or the light source 104 may be used to detect the edge of the media if non-transparency media is to be detected. If the light source 102 is used, for instance, the signal will transition from a high level to a lower level due to the sudden drop in transmissivity.

Figure 4G:
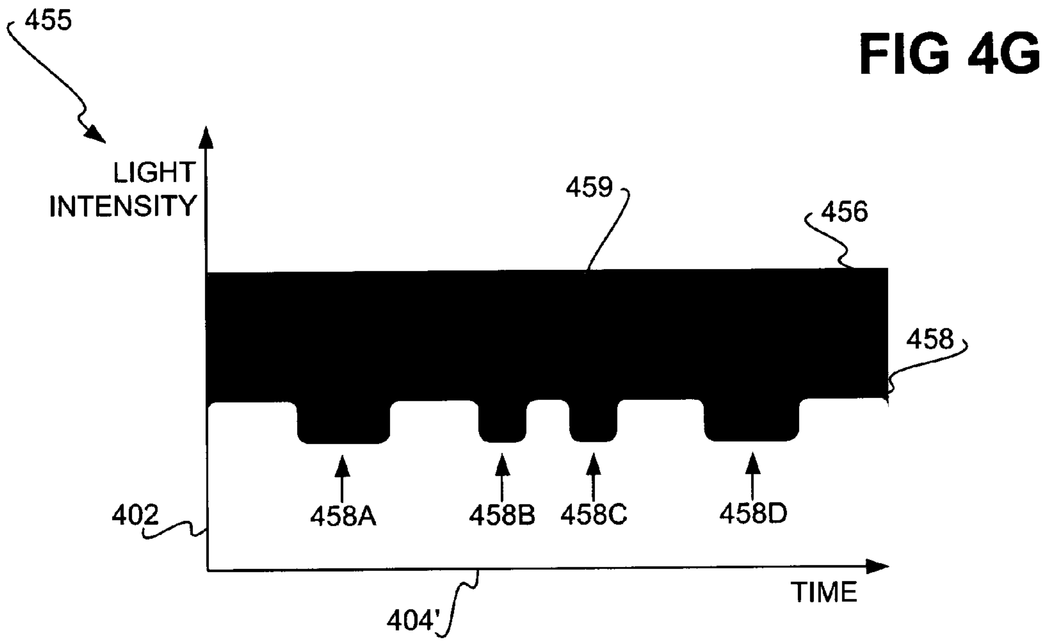
Figure 4H:
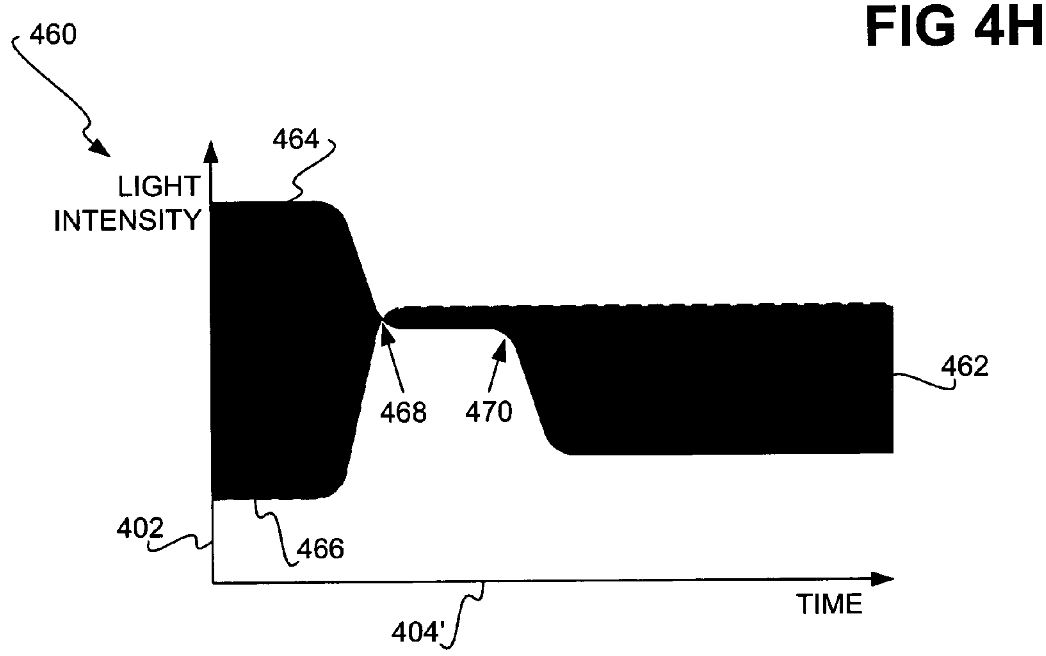

In FIGS. 4G and 4H, the x-axis has been relabeled as the x-axis 404', as opposed to the x-axis 404 of FIGS. 4A–4F. This is to indicate that the time represented by the x-axis 404' in FIGS. 4G and 4H has increased by at least an order of ten as compared to the time represented by the x-axis 404 in FIGS. 4A–4F. In FIGS. 4A–4F, the time indicated by the x-axis 404 represents just a few occurrences of the period over which each of the light sources 102 and 104 is turned on and off. By comparison, in FIGS. 4G and 4H, the time indicated by the x-axis 404 represents at least an order of ten of this period. The lines 408, 421, 432, 441, and 446 of FIGS. 4A–4E clearly denote the light 204 and 304 detected by the detector 106 as the light sources 102 and 104 are turned on and off in succession, whereas FIG. 4F denotes that just the light source 104 is on. By comparison, because the x-axis 404' of FIGS. 4G and 4H has a larger length of time compressed into the same space as the x-axis 404 of FIGS. 4A–4F, FIGS. 4G and 4H show the envelope of the signals of the detector 106 resulting from the alternation of light sources 102 and 104.

For example, in FIG. 4G, the graph 455 shows a waveform 459 that represents the light 204 and 304 detected by the detector 106. The defining line 456 of the waveform 459 denotes the reflected light 304 detected by the detector 106, whereas the defining line 458 of the waveform 459 denotes the transmitted light 204 detected by the detector 106. The graph 455 specifically depicts the situation where the media 110 traveling between the light sources 102 and 104 is photo paper media that has a bar-type code imprinted on the side 114 of the media 110 incident to the light source 102.

Thus, the transmitted light 204 detected by the detector 106, as indicated by the lower line 458, varies between two values in the graph 455 of FIG. 4G. Instances of the lower values, as indicated by the reference numbers 458A, 458B, 458C, and 458D, indicate a solid bar of the bar-type code imprinted on the media 110, such that the transmitted light 204 is substantially decreased. If the bar-type code is imprinted with an ink that is invisible to visible light, but absorptive to infrared (IR) light, then the code can be at least substantially visually undetectable by a user but still read by the detector 106. By counting the number of such lower value instances, as well as the length of each instance and the separation of adjacent instances, the controller 108 of the sensing mechanism 100 can recognize the code imprinted on the side 114 of the media 110.

In FIG. 4H, the graph 460 depicts the situation where two sheets of plain paper media 110 are picked up in rapid succession and travel between the light sources 102 and 104. This is a multi-pick situation, where two sheets of plain paper media 110 overlap and travel through the image-forming device of which the sensing mechanism 100 is a part, instead of just one sheet of plain paper media 110 as anticipated. The graph 460 shows a waveform 462 that represents the light 204 and 304 detected by the detector 106. The solid defining line 464 denotes the transmitted light 204 detected by the detector 106, whereas the dotted defining line 466 denotes the reflected light 304 detected by the detector 106.

Before the point 468 of the graph 460 of FIG. 4H, the transmitted light 204 is at a maximum value and the reflected light 304 is at a minimum value, corresponding to no sheets of the media 110 moving between the light sources 102 and 104. Between the points 468 and 470, the first sheet of the media 110 has been loaded and is moving between the light sources 102 and 104. The transmitted light 204 and the reflected light 304 have about the same value. After the point 470, the second sheet of the media 110 has been loaded, overlapping with the first sheet, such that the two sheets of media 110 are moving between the light sources 102 and 104. The value of the reflected light 304 does not change. However, the value of the transmitted light 204 decreases substantially, since less of the light 118 emitted by the light source 102 can transmit through the two sheets of media 110.

Methods and Image-forming Device

Figure 5:
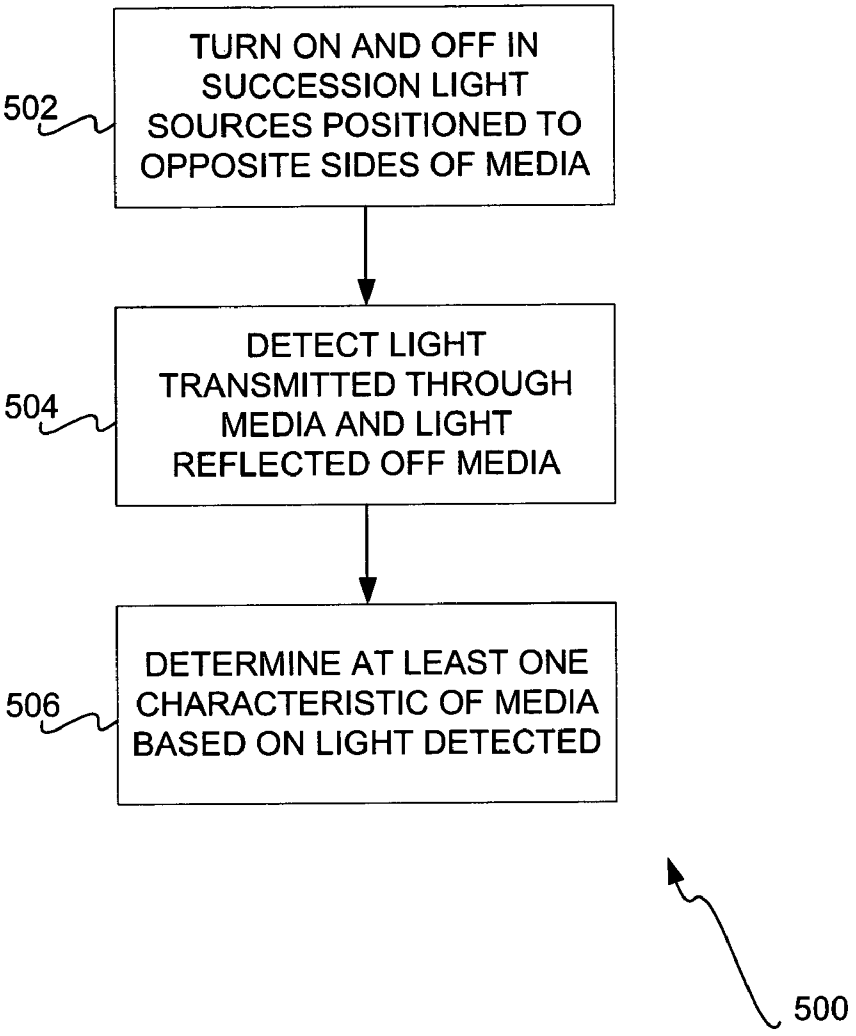
FIG. 5 is a flowchart of a method, according to an embodiment of the invention.

FIG. 5 shows a method 500 that can be performed by or in conjunction with the sensing mechanism 100, according to an embodiment of the invention. The light sources 102 and 104 are turned on and off in rapid succession (502), at a frequency having a corresponding period. The light 204 transmitted through the media 110 traveling between the light sources 102 and 104 is detected, as well as the light 304 reflected off the media 110 (504). The light 204 and the light 304 may be detected over a length of time corresponding to just a few occurrences of the period to which the frequency at which the light sources 102 and 104 are turned on and off in rapid succession. Alternatively, the light 204 and the light 304 may be detected over a length of time having an order of magnitude of ten or more as compared to this period. Furthermore, noise reduction techniques such as averaging may be employed.

One or more characteristics of the media 110 are then determined, or detected, based on the light 204 and the light 304 that has been detected (506). For instance, the characteristics may be determined based on the ratio of the light 204 to the light 304. The characteristics that may be determined include the media type of the media 110, the edge of the media, whether a multi-pick situation has occurred in which there is more than one sheet of the media 110, as well as any code, such as a bar-type code, that may be imprinted on the media 110, among other characteristics.

Figure 6A:
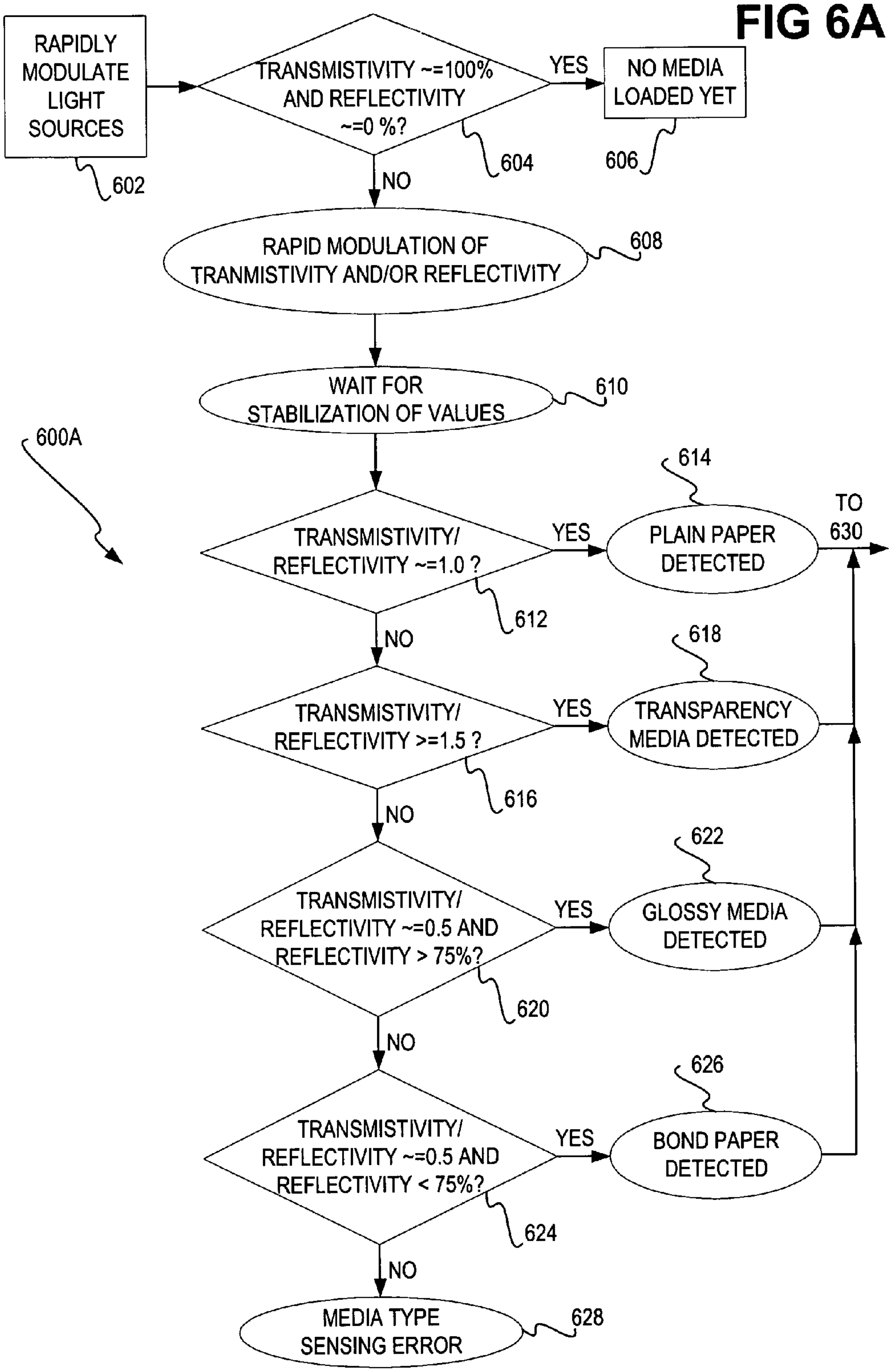
FIGS. 6A and 6B are flowcharts of a method that is consistent with the method of FIG. 5, according to another embodiment of the invention.
Figure 6B:
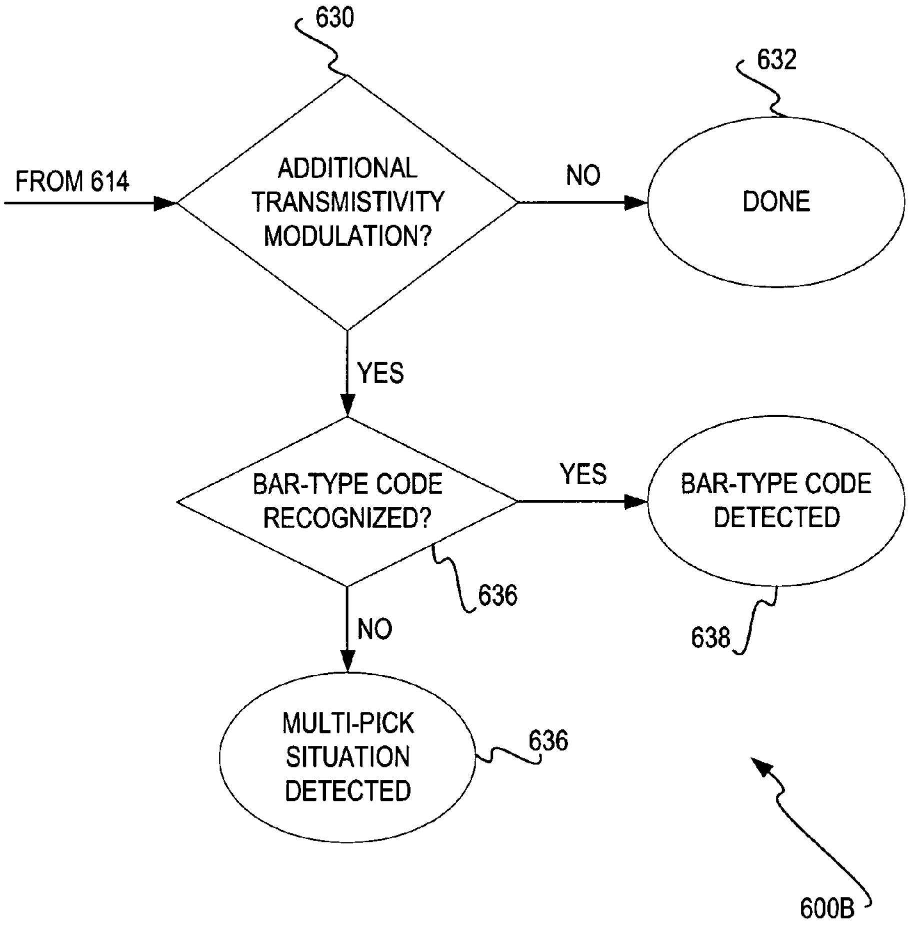

FIGS. 6A and 6B show a method 600, divided into two parts, 600A and 600B, that can also be performed by or in conjunction with the sensing mechanism 100, and that is consistent with but more detailed than the method 500 of FIG. 5, according to another embodiment of the invention. The term transmistivity as used in describing the method 600 refers to the normalized value of the light 204 transmitted through the media 110 and detected by the detector 106. The term reflectivity as used in describing the method 600 refers to the normalized value of the light 304 reflected off the media 110 and detected by the detector 106. These normalized values can be represented as percentages ranging from 0%, corresponding to minimum transmistivity or reflectivity, to 100%, corresponding to maximum transmistivity or reflectivity.

The light sources 102 and 104 are rapidly modulated (602). That is, they are turned on and off in succession, such that when the source 102 is on, the source 104 is off, and vice versa. If the transmistivity is substantially equal to 100% and the reflectivity is substantially equal to 0% (604), then the media 110 has not yet been loaded (606). That is, the media 110 is not yet traveling between the light sources 102 and 104. Once the media 110 is loaded and is traveling between the light sources 102 and 104, a rapid modulation of the transmistivity and/or the reflectivity occurs (608). The rapid modulation of the transmistivity and/or the reflectivity means that either value quickly fluctuates over time, indicating that an edge of the media 110 has been detected. Therefore, a length of time is waited for the transmistivity and the reflectivity to stabilize (610), so that a sustained ratio of the transmistivity to the reflectivity can be determined.

Thereafter, if the ratio of the transmistivity to the reflectivity is substantially equal to 1.0 (612), then the media 110 has been detected as plain paper media (614). If the ratio of the transmistivity to the reflectivity is equal to or greater than 1.5 (616), then the media 110 has been detected as transparency media (618). If the ratio of the transmistivity to the reflectivity is substantially equal to 0.5, and the reflectivity is greater than 75% (620), then the media 110 has been detected as glossy media (622). If the ratio of the transmistivity to reflectivity is substantially equal to 0.5, and the reflectivity is less than 75% (624), then the media 110 has been detected as bond paper media (626). Otherwise, a media type sensing error has occurred (628), such that the type of the media 110 has not been properly detected, and the method 600 is finished.

Assuming that the media 110 has been detected as plain paper (614), transparency media (618), glossy media (622), or bond paper (626), then the method 600 determines whether additional modulation of the transmitivity has occurred (630). If not, then the method 600 is finished (632). If additional modulation of the transmitivity has occurred, then the method 600 attempts to recognize a bar-type code as to which the modulation corresponds (634). If no such bar-type code is detected, then the method 600 concludes that a multi-pick situation has been detected (636), such that more than one sheet of the media 110 has been improperly picked up and moved between the light sources 102 and 104, and the method 600 is finished. Otherwise, the method 600 concludes that a bar-type code has been detected (638), and the method 600 is finished.

Figure 7:
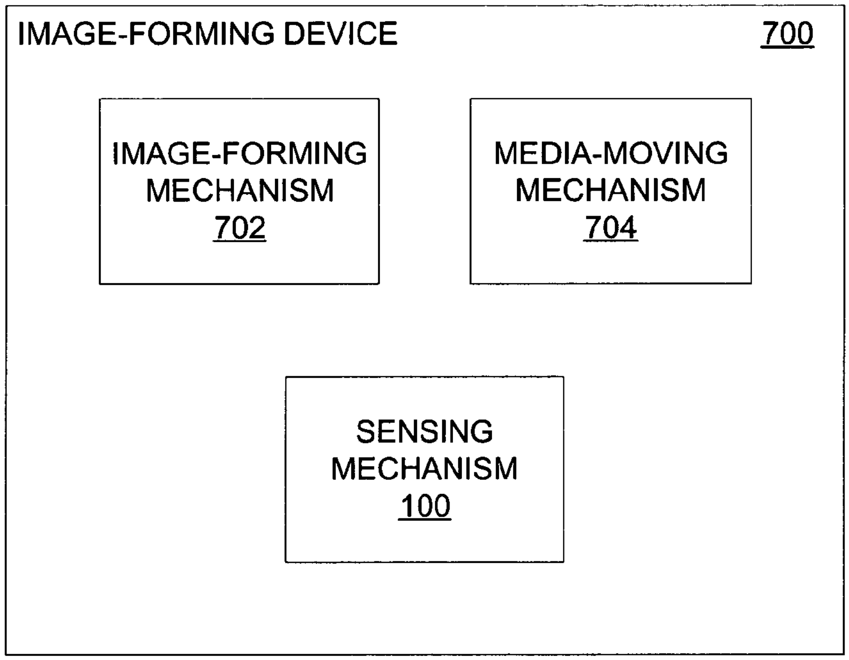
FIG. 7 is a block diagram of a representative image-forming device, according to an embodiment of the invention.

FIG. 7 shows a block diagram of a representative image-forming device 700, according to an embodiment of the invention. The image-forming device 700 is depicted in FIG. 7 as including an image-forming mechanism 702, a media-moving mechanism 704, and a sensing mechanism 100. The image-forming device 700 may also include other components, in addition to and/or in lieu of those shown in FIG. 7.

The image-forming mechanism 702 includes those components that allow the image-forming device 700 to form an image on the media 110. For instance, the image-forming mechanism 702 may be an inkjet-printing mechanism, such that the image-forming device 700 is an inkjet-printing device. Furthermore, the media-moving mechanism 704 includes those components that allow the media 110 to move through the image-forming device 700, so that an image may be formed thereon. The media-moving mechanism 704 may include rollers, motors, and other types of components.

The sensing mechanism 100 can in one embodiment be the sensing mechanism 100 that has been described in previous sections of the detailed description. For instance, the sensing mechanism 100 may detect at least one characteristic of the media 110 as the media is moved through the image-forming device, based on a ratio of the light 204 transmitted through the media 110 to the light 304 reflected off the media 110. The sensing mechanism 100 may be able to detect these characteristics independent of the distances at which the lights 204 and 304 have been detected, as has been described.

CONCLUSION

It is noted that, although specific embodiments have been illustrated and described herein, it will be appreciated by those of ordinary skill in the art that any arrangement calculated to achieve the same purpose may be substituted for the specific embodiments shown. This application is intended to cover any adaptations or variations of the disclosed embodiments of the present invention. Therefore, it is manifestly intended that this invention be limited only by the claims and equivalents thereof.

I claim:

1. A sensing mechanism for an image-forming device comprising:

- a first light source positioned incident to a first side of media;
- a second light source positioned incident to a second side of the media opposite of the first side of the media;
- a detector positioned incident to the second side of the media to detect first light transmitted through the media as output by the first light source and to detect second light reflected off the media as output by the second light source; and,
- a controller to detect at least one characteristic of the media based on a ratio of the first light to the second light.

2. The sensing mechanism of claim 1, wherein the first light source and the second light source are turned on and off in succession, such that when the first light source is outputting light the second light source is not outputting light and when the second light source is outputting light the first light source is not outputting light.

3. The sensing mechanism of claim 2, wherein the first light source and the second light source are turned on and off in succession at a frequency having a corresponding period, such that the controller is to detect the at least one characteristic of the media based on the ratio of the first light to the second light as measured after at least one occurrence of the corresponding period.

4. The sensing mechanism of claim 2, wherein the first light source and the second light source are turned on and off in succession at a frequency having a corresponding period, such that the controller is to detect the at least one characteristic of the media based on the ratio of the first light to the second light as measured after a length of time greater than the corresponding period by at least a factor of ten.

5. The sensing mechanism of claim 1, wherein each of the first light source and the second light source comprises a light-emitting diode (LED).

6. The sensing mechanism of claim 1, wherein the first light source is aimed at a right angle to the media, and the second light is aimed at an oblique angle to the media.

7. The sensing mechanism of claim 1, wherein the first light source is aimed at a right angle to the media, and the second light is aimed an angle to the detector in accordance with Snell's Law.

8. The sensing mechanism of claim 1, wherein the detector comprises a phototransistor.

9. The sensing mechanism of claim 1, wherein the at least one characteristic of the media comprises a media type, such that the sensing mechanism functions as at least a media type-sensing mechanism.

10. The sensing mechanism of claim 9, wherein the media type is selected from a plurality of media types comprising plain paper media, bond paper media, glossy media, and transparency media.

11. The sensing mechanism of claim 1, wherein the at least one characteristic of the media comprises an edge of the media, such that the sensing mechanism functions as at least an edge-sensing mechanism.

12. The sensing mechanism of claim 1, wherein the at least one characteristic of the media comprises whether the media comprises a plurality of sheets, such that the sensing mechanism functions as at least a multi-pick sensing mechanism.

13. The sensing mechanism of claim 1, wherein the at least one characteristic of the media comprises a code imprinted on the second side of the media.

14. The sensing mechanism of claim 13, wherein the code identifies at least a media type of the media.

15. An image-forming device comprising:

- an image-forming mechanism to form an image on media;
- a media-moving mechanism to move the media though the image-forming device; and,
- a sensing mechanism to detect at least one characteristic of the media as the media is moved through the image-forming device based on a ratio of light transmitted though the media and light reflected off the media.

16. The image-forming device of claim 15, wherein the sensing mechanism comprises:

- a plurality of light sources to generate the light transmitted through the media and the light reflected off the media;
- at least one detector to detect the light transmitted through the media and the light reflected off the media; and, a controller to detect the at least one characteristic of the media based on the ratio of the light transmitted through the media and the light reflected off the media.

17. The image-forming device of claim 16, wherein the controller is further to turn the plurality of light sources on and off in succession at a frequency.

18. The image-forming device of claim 15, wherein the at least one characteristic comprises one or more of: a media type of the media; an edge of the media; whether the media comprises a plurality of sheets; and, a code imprinted on the media.

19. The image-forming device of claim 15, wherein the image-forming mechanism is an inkjet-printing mechanism, such that the image-forming device is an inkjet-printing device.

20. An image-forming device comprising:

means for forming an image on media;

means for moving the media through the image-forming device; and, means for detecting at least one characteristic of the media as the media is moved through the image-forming device based on first light transmitted through the media and second light reflected off the media independent of distances at which the first light and the second light are detected.

21. The image-forming device of claim 20, wherein the means for detecting is for detecting the at least one characteristic of the media based on a ratio of the first light to the second light.

22. The image-forming device of claim 20, wherein the means for forming the image on the media is for ejecting ink onto the media, such that the image-forming device is an inkjet-printing device.

23. A method comprising:

turning on and off in succession a first light source and a second light source positioned incident to opposite sides of media;

detecting first light transmitted through the media by the first light source and second light reflected off the media by the second light source; and, determining at least one characteristic of the media based on the first light and the second light detected.

24. The method of claim 23, wherein turning on and off in succession the first light source and the second light source comprises turning on and off in succession the first light source and the second light source at a frequency having a corresponding period, wherein detecting the first light and the second light comprises detecting the first light and the second light over at least one occurrence of the corresponding period.

25. The method of claim 23, wherein turning on and off in succession the first light source and the second light source comprises turning on and off in succession the first light source and the second light source at a frequency having a corresponding period, wherein detecting the first light and the second light comprises detecting the first light and the second light over a length of time greater than the corresponding period by at least a factor of ten.

26. The method of claim 23, wherein determining the at least one characteristic of the media comprises determining the at least one characteristic of the media based on a ratio of the first light to the second light.

27. The method of claim 26, wherein determining the at least one characteristic of the media comprises concluding that the media is plain paper media where the ratio is substantially equal to 1.0.

28. The method of claim 26, wherein determining the at least one characteristic of the media comprises concluding that the media is transparency media where the ratio is greater than 1.5.

29. The method of claim 26, wherein determining the at least one characteristic of the media comprises concluding that the media is glossy media where the ratio is substantially equal to 0.5 and the second light has a detected value of greater than 75%.

30. The method of claim 26, wherein determining the at least one characteristic of the media comprises concluding that the media is bond paper media where the ratio is substantially equal to 0.5 and the second light has a detected value of less than 75%.

31. The method of claim 23, wherein determining the at least one characteristic of the media comprises concluding that a no media-load situation has occurred where a detected value of the first light is substantially equal to 100% and a detected value of the second light is substantially equal to 0%.

32. The method of claim 23, wherein determining the at least one characteristic of the media comprises sensing an edge of the media when modulation of at least one of a detected value of the first light and a detected value of a second light initially occurs.

33. The method of claim 23, wherein determining the at least one characteristic of the media comprises sensing a code imprinted on the media where modulation of a detected value of the first light occurs and where the modulation is recognizable.

34. The method of claim 23, wherein determining the at least one characteristic of the media comprises concluding that a multiple media sheet-pick situation has occurred where modulation of a detected value of the first light occurs and where the modulation is unrecognizable.

35. The method of claim 23, wherein determining the at least one characteristic of the media comprises determining at least one of: a media type of the media; an edge of the media; whether the media comprises a plurality of sheets; and, a code imprinted on the media.

* * * * *